United States Patent
Chang et al.

(10) Patent No.: US 9,848,409 B2
(45) Date of Patent: Dec. 19, 2017

(54) RESOURCE SCHEDULING METHOD, DEVICE, AND COMMUNICATIONS SYSTEM

(71) Applicant: Huawei Technologies Co., Ltd., Shenzhen (CN)

(72) Inventors: Junren Chang, Beijing (CN); Yajuan Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/656,129

(22) Filed: Mar. 12, 2015

(65) Prior Publication Data

US 2015/0189570 A1  Jul. 2, 2015

Related U.S. Application Data

(63) Continuation of application No. PCT/CN2013/081509, filed on Aug. 15, 2013.

(30) Foreign Application Priority Data

Sep. 12, 2012 (CN) .......................... 2012 1 0336540

(51) Int. Cl.
*H04W 72/04* (2009.01)
*H04L 5/00* (2006.01)
(Continued)

(52) U.S. Cl.
CPC ....... *H04W 72/0406* (2013.01); *H04L 5/0035* (2013.01); *H04L 5/0087* (2013.01);
(Continued)

(58) Field of Classification Search
CPC ..... H04W 36/22; H04W 24/02; H04W 28/08; H04W 84/045; H04W 16/14;
(Continued)

(56) References Cited

U.S. PATENT DOCUMENTS

| 2006/0142021 A1 | 6/2006 | Mueckenheim et al. |
| 2010/0284354 A1* | 11/2010 | Ostergaard ........ H04W 72/1284 370/329 |

(Continued)

FOREIGN PATENT DOCUMENTS

| CN | 101790171 A | 7/2010 |
| CN | 102045851 A | 5/2011 |

(Continued)

*Primary Examiner* — Magdi Elhag
(74) *Attorney, Agent, or Firm* — Leydig, Voit & Mayer, Ltd.

(57) ABSTRACT

Embodiments of the present invention disclose a resource scheduling method, device, and communications system. The method includes: sending, by a first base station, a first data offloading proportion to a user equipment; receiving, by the first base station, a first buffer status report that is generated based on the first data offloading proportion and sent by the user equipment, where a buffered data volume included in the first buffer status report needs to be transmitted by the first base station; sending, by the first base station, uplink resource scheduling information to the user equipment based on the first buffer status report, where an uplink transmission resource indicated by the uplink resource scheduling information is used to transmit uplink data of the user equipment that should be borne by the first base station. The embodiments of the present invention are applied to resource scheduling.

8 Claims, 9 Drawing Sheets

(51) Int. Cl.
*H04W 72/12* (2009.01)
*H04W 36/22* (2009.01)

(52) U.S. Cl.
CPC ....... *H04W 36/22* (2013.01); *H04W 72/0486* (2013.01); *H04W 72/1252* (2013.01)

(58) Field of Classification Search
CPC . H04W 72/1252; H04W 72/10; H04W 48/06; H04W 72/005; H04W 72/0406; H04W 36/26; H04W 76/025; H04W 28/20; H04W 36/165; H04W 88/10; H04W 36/28; H04W 72/0486; H04W 72/12; H04W 72/121; H04W 72/1215; H04W 72/1226; H04W 72/1268; H04W 72/1284; H04W 72/0413; H04W 72/1205; H04L 5/0035; H04L 5/0085
USPC ........................................................ 455/453
See application file for complete search history.

(56) References Cited

U.S. PATENT DOCUMENTS

| | | |
|---|---|---|
| 2011/0151886 A1 | 6/2011 | Grayson et al. |
| 2011/0310814 A1 | 12/2011 | Callard et al. |
| 2011/0319091 A1 | 12/2011 | Lee et al. |
| 2012/0087396 A1* | 4/2012 | Nimbalker ............ H04L 1/1822 375/219 |
| 2012/0099452 A1* | 4/2012 | Dai ................... H04W 72/1221 370/252 |
| 2013/0028201 A1* | 1/2013 | Koo .................. H04W 72/1215 370/329 |
| 2013/0114445 A1* | 5/2013 | Wen ...................... H04L 5/0007 370/252 |
| 2014/0029584 A1* | 1/2014 | Qu ...................... H04W 72/042 370/336 |
| 2014/0286295 A1* | 9/2014 | Liu ....................... H04W 72/10 370/329 |
| 2015/0009923 A1* | 1/2015 | Lei .................... H04W 72/0413 370/329 |
| 2015/0110018 A1* | 4/2015 | Rosa ................. H04W 72/0426 370/329 |

FOREIGN PATENT DOCUMENTS

| | | | |
|---|---|---|---|
| CN | 102300220 A | 12/2011 | |
| CN | 102421146 A | 4/2012 | |
| WO | WO 2010083735 A1 | 7/2010 | |
| WO | WO 2013116988 A1 * | 8/2013 | ........ H04W 72/0413 |

* cited by examiner

RESOURCE SCHEDULING METHOD, DEVICE, AND COMMUNICATIONS SYSTEM

CROSS-REFERENCE TO RELATED APPLICATIONS

This application is a continuation of International Patent Application No. PCT/CN2013/081509, filed Aug. 15, 2013, which claims priority to Chinese Patent Application No. 201210336540.8, filed Sep. 12, 2012, both of which are hereby incorporated by reference in their entireties.

TECHNICAL FIELD

The present embodiment of the invention relates to the field of communications, and in particular, to a resource scheduling method, device, and communications system.

BACKGROUND

With the development of mobile communications technologies, transmission rates that communications systems can provide are increasingly higher, and meanwhile, users also have increasingly higher requirements on the transmission rates that the systems can provide. To meet a demand of a general user for a system transmission rate, and meanwhile, to provide a service of a higher system transmission rate for some users, in a situation in which substantially increasing a configured bandwidth is avoided, the 3rd Generation Partnership Project (The 3rd Generation Partnership Project, 3GPP for short) introduces a carrier aggregation technology. In this case, a user equipment may simultaneously use multiple component carriers to perform uplink and downlink communication, thereby supporting high speed data transmission; when the demand of a user for the system transmission rate decreases, some component carriers may also be released, and meanwhile a resident carrier is retained, so that a released transmission resource may be provided for another user to use.

Carrier aggregation is further divided into intra-band carrier aggregation and inter-band carrier aggregation. For the intra-band carrier aggregation, multiple carriers are in a same band; therefore, coverage consistency of the intra-band carrier aggregation can be kept. For the inter-band carrier aggregation, two bands participating in aggregation are relatively far apart; therefore, a coverage difference is large. Generally, a low-band carrier (also referred to as a low-frequency carrier) has relatively large coverage, while a high-band carrier (also referred to as a high-frequency carrier) has relatively small coverage. The low-frequency carrier, having relatively large coverage, can well used for performing connection controlling. A main feature of the high-frequency carrier is that resources abound, so that a very large bandwidth can be allocated for data transmission; but the coverage of the high-frequency carrier is relatively small; as a result, a user equipment can easily move out of the coverage of the high-frequency carrier.

In the foregoing scenario, the relatively small coverage of the high-frequency carrier causes the user equipment to easily move out of the coverage of the high-frequency carrier, resulting in frequent handover or base station reselection. To avoid occurrence of the frequent handover or the base station reselection of the user equipment, a control plane and a data plane of the user equipment may be separated, that is, control signaling and service data may be not necessarily transmitted on a completely same carrier. A relatively stable low-frequency carrier is used to transmit the control signaling of the user equipment, and only the high-frequency carrier is used to transmit data. However, if all data is transmitted on the high-frequency carrier, insufficiency of transmission resources of the high-frequency carrier is caused. Therefore, how a user equipment can fully use a high-frequency carrier and a low-frequency carrier to perform data transmission becomes a problem.

SUMMARY

Embodiments of the present invention provide a resource scheduling method, device, and communications system, so as to ensure that a high rate data service is provided for a user, and also implement allocation, of a data service of a user equipment, between different base stations.

According to a first aspect, a resource scheduling method is provided, including:

sending, by a first base station, a first data offloading proportion to a user equipment, where the first data offloading proportion includes at least one of the following items: a proportion of data of the user equipment that should be borne by a second base station to data of the user equipment that should be borne by the first base station, a proportion of the data of the user equipment that should be borne by the first base station to the data of the user equipment that should be borne by the second base station, a proportion of the data of the user equipment that should be borne by the second base station to data of the user equipment that should be jointly borne by the first base station and the second base station, and a proportion of the data of the user equipment that should be borne by the first base station to the data of the user equipment that should be jointly borne by the first base station and the second base station;

receiving, by the first base station, a first buffer status report that is generated based on the first data offloading proportion and sent by the user equipment, where a buffered data volume included in the first buffer status report needs to be transmitted by the first base station; and sending, by the first base station, uplink resource scheduling information to the user equipment based on the first buffer status report, where an uplink transmission resource indicated by the uplink resource scheduling information is used to transmit uplink data of the user equipment that should be borne by the first base station.

With reference to the first aspect, in a first possible implementation manner, the first base station is a macro base station, the second base station is a micro base station, and the sending, by a first base station, a first data offloading proportion to a user equipment includes: sending, by the first base station, the first data offloading proportion to the user equipment through the second base station; or the first base station is a micro base station, the second base station is a macro base station, and the sending, by a first base station, a first data offloading proportion to a user equipment includes: sending, by the first base station, the first data offloading proportion received from the second base station to the user equipment.

With reference to the first aspect or the first possible implementation manner, in a second possible implementation manner, a first carrier used by the first base station to serve the user equipment and a second carrier used by the second base station to serve the user equipment are different in frequency.

According to a second aspect, a resource scheduling method is provided, including:

receiving, by a user equipment, a first data offloading proportion from a first base station or a second base station, where the first data offloading proportion includes at least one of the following items: a proportion of data of the user equipment that should be borne by the first base station to data of the user equipment that should be borne by the second base station, a proportion of the data of the user equipment that should be borne by the second base station to the data of the user equipment that should be borne by the first base station, a proportion of the data of the user equipment that should be borne by the second base station to data of the user equipment that should be jointly borne by the first base station and the second base station, and a proportion of the data of the user equipment that should be borne by the first base station to the data of the user equipment that should be jointly borne by the first base station and the second base station;

generating, by the user equipment based on the first data offloading proportion, a first buffer status report and a second buffer status report, where a buffered data volume included in the first buffer status report needs to be transmitted by the first base station, and a buffered data volume included in the second buffer status report needs to be transmitted by the second base station;

sending, by the user equipment, the first buffer status report to the first base station, and sending the second buffer status report to the second base station; and receiving, by the user equipment, first uplink resource scheduling information that is sent by the first base station based on the first buffer status report, and second uplink resource scheduling information that is sent by the second base station based on the second buffer status report, where a first uplink transmission resource indicated by the first uplink resource scheduling information is used to transmit the data of the user equipment that should be borne by the first base station, and a second uplink transmission resource indicated by the second uplink resource scheduling information is used to transmit the data of the user equipment that should be borne by the second base station.

With reference to the second aspect, in a first possible implementation manner, a proportion of the buffered data volume included in the first buffer status report to the buffered data volume included in the second buffer status report is determined by the user equipment based on the first data offloading proportion.

With reference to the second aspect or the first possible implementation manner, in a second possible implementation manner, a first carrier used by the first base station to serve the user equipment and a second carrier used by the second base station to serve the user equipment are different in frequency.

According to a third aspect, a resource scheduling method is provided, including:

receiving, by a first base station, a third buffer status report sent by a user equipment, where the third buffer status report includes a total buffered data volume of the user equipment;

generating, by the first base station, a fourth buffer status report according to the third buffer status report and a data offloading proportion that should be borne by a second base station, where the data offloading proportion that should be borne by the second base station includes at least one of the following items: a proportion of data of the user equipment that should be borne by the second base station to data of the user equipment that should be borne by the first base station, and a proportion of the data of the user equipment that should be borne by the second base station to data of the user equipment that should be jointly borne by the first base station and the second base station, and a buffered data volume included in the fourth buffer status report needs to be transmitted by the second base station; and sending, by the first base station, the fourth buffer status report to the second base station, so that the second base station transmits some data of the user equipment based on the fourth buffer status report.

With reference to the third aspect, in a first possible implementation manner, the first base station is a macro base station, the second base station is a micro base station, and the total buffered data volume includes a control signaling data packet; and the method further includes: prioritizing, by the first base station itself, transmission of the control signaling data packet.

With reference to the third aspect or the first possible implementation manner, in a second possible implementation manner, a first carrier used by the first base station to serve the user equipment and a second carrier used by the second base station to serve the user equipment are different in frequency.

According to a fourth aspect, a resource scheduling method is provided, including:

receiving, by a first base station, a fifth buffer status report sent by a user equipment, where the fifth buffer status report includes a total buffered data volume of the user equipment;

sending, by the first base station, uplink resource scheduling information to the user equipment according to the fifth buffer status report and a data offloading proportion that should be borne by the first base station, where an uplink transmission resource indicated by the uplink resource scheduling information is used to transmit uplink data of the user equipment that should be borne by the first base station, where the data offloading proportion that should be borne by the first base station includes at least one of the following items: a proportion of data of the user equipment that should be borne by the first base station to data of the user equipment that should be borne by a second base station, and a proportion of the data of the user equipment that should be borne by the first base station to data of the user equipment that should be jointly borne by the first base station and the second base station.

With reference to the fourth aspect, in a first possible implementation manner, before the receiving, by a first base station, a fifth buffer status report sent by a user equipment, the method further includes:

determining, by the first base station, the data offloading proportion that should be borne by the first base station, and sending the data offloading proportion that should be borne by the first base station to the second base station; or receiving, by the first base station, the data offloading proportion that should be borne by the first base station from the second base station.

With reference to the fourth aspect or the first possible implementation manner, in a second possible implementation manner, a first carrier used by the first base station to serve the user equipment and a second carrier used by the second base station to serve the user equipment are different in frequency.

According to a fifth aspect, a first base station is provided, including:

a first offloading proportion sending unit, configured to send a first data offloading proportion to a user equipment, where the first data offloading proportion includes at least one of the following items: a proportion of data of the user equipment that should be borne by a second base station to data of the user equipment that should be borne by the first base station, a proportion of the data of the user equipment that should be borne by the first base station to the data of the user equipment that should be borne by the second base station, a proportion of the data of the user equipment that should be borne by the second base station to data of the user equipment that should be jointly borne by the first base station and the second base station, and a proportion of the data of the user equipment that should be borne by the first base station to the data of the user equipment that should be jointly borne by the first base station and the second base station;

a first report receiving unit, configured to receive a first buffer status report that is generated based on the first data offloading proportion and sent by the user equipment, where a buffered data volume included in the first buffer status report needs to be transmitted by the first base station; and a first uplink resource scheduling information sending unit, configured to send uplink resource scheduling information to the user equipment based on the first buffer status report, where an uplink transmission resource indicated by the uplink resource scheduling information is used to transmit uplink data of the user equipment that should be borne by the first base station.

With reference to the fifth aspect, in a first possible implementation manner, the first base station is a macro base station, the second base station is a micro base station, and the first offloading proportion sending unit is specifically configured to send the first data offloading proportion to the user equipment through the second base station; or the first base station is a micro base station, the second base station is a macro base station, and the first offloading proportion sending unit is specifically configured to send the first data offloading proportion received from the second base station to the user equipment.

With reference to the fifth aspect or the first possible implementation manner, in a second possible implementation manner, a first carrier used by the first base station to serve the user equipment and a second carrier used by the second base station to serve the user equipment are different in frequency.

According to a sixth aspect, a user equipment is provided, including:

a first offloading proportion receiving unit, configured to receive a first data offloading proportion from a first base station or a second base station, where the first data offloading proportion includes at least one of the following items: a proportion of data of the user equipment that should be borne by the first base station to data of the user equipment that should be borne by the second base station, a proportion of the data of the user equipment that should be borne by the second base station to the data of the user equipment that should be borne by the first base station, a proportion of the data of the user equipment that should be borne by the second base station to data of the user equipment that should be jointly borne by the first base station and the second base station, and a proportion of the data of the user equipment that should be borne by the first base station to the data of the user equipment that should be jointly borne by the first base station and the second base station;

a report generating unit, configured to generate, based on the first data offloading proportion, a first buffer status report and a second buffer status report, where a buffered data volume included in the first buffer status report needs to be transmitted by the first base station, and a buffered data volume included in the second buffer status report needs to be transmitted by the second base station;

a report sending unit, configured to send the first buffer status report to the first base station, and send the second buffer status report to the second base station; and an uplink resource scheduling information receiving unit, configured to receive first uplink resource scheduling information sent by the first base station based on the first buffer status report, and second uplink resource scheduling information sent by the second base station based on the second buffer status report, where a first uplink transmission resource indicated by the first uplink resource scheduling information is used to transmit the data of the user equipment that should be borne by the first base station, and a second uplink transmission resource indicated by the second uplink resource scheduling information is used to transmit the data of the user equipment that should be borne by the second base station.

With reference to the sixth aspect, in a first possible implementation manner, a proportion of the buffered data volume included in the first buffer status report to the buffered data volume included in the second buffer status report is determined by the user equipment based on the first data offloading proportion.

With reference to the sixth aspect or the first possible implementation manner, in a second possible implementation manner, a first carrier used by the first base station to serve the user equipment and a second carrier used by the second base station to serve the user equipment are different in frequency.

According to a seventh aspect, a first base station is provided, including:

a third report receiving unit, configured to receive a third buffer status report sent by a user equipment, where the third buffer status report includes a total buffered data volume of the user equipment;

a fourth report generating unit, configured to generate a fourth buffer status report according to the third buffer status report and a data offloading proportion that should be borne by a second base station, where the data offloading proportion that should be borne by the second base station includes at least one of the following items: a proportion of data of the user equipment that should be borne by the second base station to data of the user equipment that should be borne by the first base station, and a proportion of the data of the user equipment that should be borne by the second base station to data of the user equipment that should be jointly borne by the first base station and the second base station, and a buffered data volume included in the fourth buffer status report needs to be transmitted by the second base station; and a fourth report sending unit, configured to send the fourth buffer status report to the second base station, so that the second base station transmits some data of the user equipment based on the fourth buffer status report.

With reference to the seventh aspect, in a first possible implementation manner, the first base station is a macro base station, the second base station is a micro base station, and the total buffered data volume includes a control signaling data packet; and the first base station itself prioritizes transmission of the control signaling data packet.

With reference to the seventh aspect or the first possible implementation manner, in a second possible implementation manner, a first carrier used by the first base station to serve the user equipment and a second carrier used by the second base station to serve the user equipment are different in frequency.

According to an eighth aspect, a first base station is provided, including:

a fifth report receiving unit, configured to receive a fifth buffer status report sent by a user equipment, where the fifth buffer status report includes a total buffered data volume of the user equipment;

a second uplink resource scheduling information sending unit, configured to send uplink resource scheduling information to the user equipment according to the fifth buffer status report and a data offloading proportion that should be borne by the first base station, where an uplink transmission resource indicated by the uplink resource scheduling information is used to transmit uplink data of the user equipment that should be borne by the first base station, where the data offloading proportion that should be borne by the first base station includes at least one of the following items: a proportion of data of the user equipment that should be borne by the first base station to data of the user equipment that should be borne by a second base station, and a proportion of the data of the user equipment that should be borne by the first base station to data of the user equipment that should be jointly borne by the first base station and the second base station.

With reference to the eighth aspect, in a first possible implementation manner, the first base station further includes: an offloading unit, where the offloading unit is configured to determine the data offloading proportion that should be borne by the first base station, and send the data offloading proportion that should be borne by the first base station to the second base station, or the offloading unit is configured to receive the data offloading proportion that should be borne by the first base station from the second base station.

With reference to the eighth aspect or the first possible implementation manner, in a second possible implementation manner, a first carrier used by the first base station to serve the user equipment and a second carrier used by the second base station to serve the user equipment are different in frequency.

According to a ninth aspect, a communications system is provided, including: a first base station, a second base station, and a user equipment, where the first base station is any base station according to the fifth aspect, the first possible implementation manner of the fifth aspect, or the second possible implementation manner of the fifth aspect, and the user equipment is any user equipment according to the sixth aspect, the first possible implementation manner of the sixth aspect, or the second possible implementation manner of the sixth aspect;

or, the first base station is any base station according to the seventh aspect, the first possible implementation manner of the seventh aspect, or the second possible implementation manner of the seventh aspect;

or, the first base station is any base station according to the eighth aspect, the first possible implementation manner of the eighth aspect, or the second possible implementation manner of the eighth aspect.

According to the resource scheduling method, device, and communications system provided by the embodiments of the present invention, a base station determines uplink resource scheduling information by using a corresponding data offloading proportion and a buffer status report that is sent by a user equipment, so as to ensure that a high rate data service is provided for a user, and also implement allocation, of a data service of the user equipment, between different base stations.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
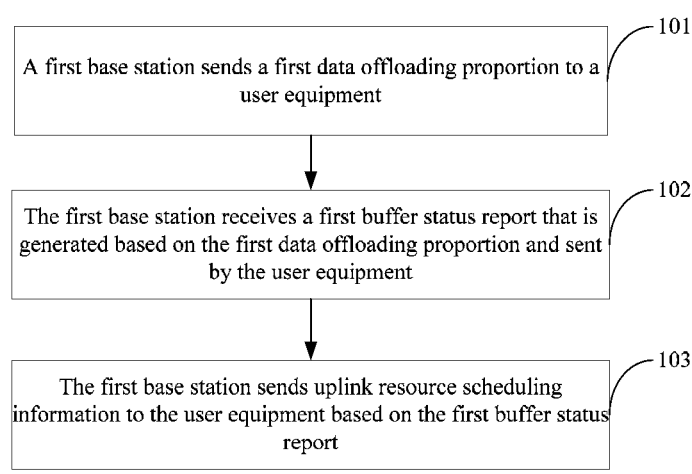
FIG. 1 is a schematic flowchart of a resource scheduling method according to an embodiment of the present invention.

An embodiment of the present invention provides a resource scheduling method. Referring to FIG. 1, a first base station side includes the following processes:

101: A first base station sends a first data offloading proportion to a user equipment.

The first data offloading proportion includes at least one of the following items: a proportion of data of the user equipment that should be borne by a second base station to data of the user equipment that should be borne by the first base station, a proportion of the data of the user equipment that should be borne by the first base station to the data of the user equipment that should be borne by the second base station, a proportion of the data of the user equipment that should be borne by the second base station to data of the user equipment that should be jointly borne by the first base station and the second base station, and a proportion of the data of the user equipment that should be borne by the first base station to the data of the user equipment that should be jointly borne by the first base station and the second base station.

Optionally, the first base station is a macro base station, the second base station is a micro base station, and the sending, by a first base station, a first data offloading proportion to a user equipment in step 101 includes: sending, by the first base station, the first data offloading proportion to the user equipment through the second base station; or the first base station is a micro base station, the second base station is a macro base station, and the sending, by a first base station, a first data offloading proportion to a user equipment in step 101 includes: sending, by the first base station, the first data offloading proportion received from the second base station to the user equipment.

102: The first base station receives a first buffer status report that is generated based on the first data offloading proportion and sent by the user equipment.

A buffered data volume included in the first buffer status report needs to be transmitted by the first base station.

103: The first base station sends uplink resource scheduling information to the user equipment based on the first buffer status report.

An uplink transmission resource indicated by the uplink resource scheduling information is used to transmit uplink data of the user equipment that should be borne by the first base station.

Further, a first carrier used by the first base station to serve the user equipment and a second carrier used by the second base station to serve the user equipment are different in frequency.

Figure 2:
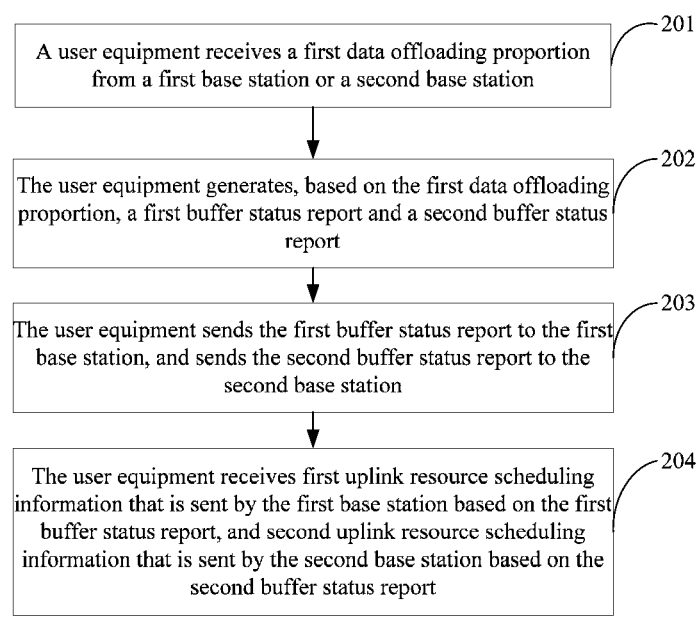
FIG. 2 is a schematic flowchart of another resource scheduling method according to an embodiment of the present invention.

An embodiment of the present invention provides another resource scheduling method. Referring to FIG. 2, a user equipment side includes the following processes:

201: A user equipment receives a first data offloading proportion from a first base station or a second base station.

The first data offloading proportion includes at least one of the following items: a proportion of data of the user equipment that should be borne by the first base station to data of the user equipment that should be borne by the second base station, a proportion of the data of the user equipment that should be borne by the second base station to the data of the user equipment that should be borne by the first base station, a proportion of the data of the user equipment that should be borne by the second base station to data of the user equipment that should be jointly borne by the first base station and the second base station, and a proportion of the data of the user equipment that should be borne by the first base station to the data of the user equipment that should be jointly borne by the first base station and the second base station.

202: The user equipment generates, based on the first data offloading proportion, a first buffer status report and a second buffer status report.

A buffered data volume included in the first buffer status report needs to be transmitted by the first base station, and a buffered data volume included in the second buffer status report needs to be transmitted by the second base station.

203: The user equipment sends the first buffer status report to the first base station, and sends the second buffer status report to the second base station.

Further, a proportion of the buffered data volume included in the first buffer status report to the buffered data volume included in the second buffer status report is determined by the user equipment based on the first data offloading proportion.

204: The user equipment receives first uplink resource scheduling information that is sent by the first base station based on the first buffer status report, and second uplink resource scheduling information that is sent by the second base station based on the second buffer status report.

A first uplink transmission resource indicated by the first uplink resource scheduling information is used to transmit the data of the user equipment that should be borne by the first base station, and a second uplink transmission resource indicated by the second uplink resource scheduling information is used to transmit the data of the user equipment that should be borne by the second base station.

In addition, a first carrier used by the first base station to serve the user equipment and a second carrier used by the second base station to serve the user equipment are different in frequency.

According to the resource scheduling method provided by this embodiment of the present invention, a base station determines uplink resource scheduling information by using a corresponding data offloading proportion and a buffer status report that is sent by a user equipment, so as to implement flexible and proper allocation, of a data service of the user equipment, between different base stations on a basis of meeting a high rate service demand of the user equipment.

Figure 3:
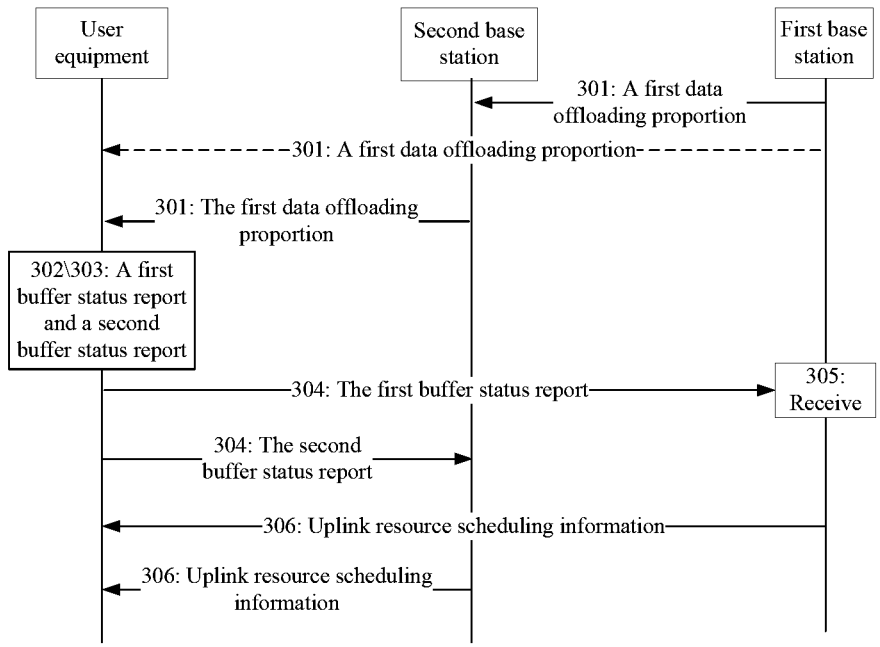
FIG. 3 is a schematic flowchart of still another resource scheduling method according to an embodiment of the present invention.

Specifically, an embodiment of the present invention provides a resource scheduling method. In this embodiment, descriptions are provided by using an example in which a first base station is a Macro eNB (macro evolved node base, macro evolved node base, macro eNB for short), and a second base station is a pico eNB (Pico eNB) controlled by the macro eNB or a femto eNB (femto eNB) controlled by the macro eNB. For example, in a 3GPP LTE (the 3rd generation partnership project long term evolution, the 3rd Generation Partnership Project Long Term Evolution) standard, a Macro eNB is used to represent a first base station. Corresponding to a user equipment, referring to FIG. 3, the method includes the following processes:

301: A first base station sends a first data offloading proportion to a user equipment.

The first data offloading proportion includes at least one of the following items: a proportion of data of the user equipment that should be borne by a second base station to data of the user equipment that should be borne by the first base station, a proportion of the data of the user equipment that should be borne by the first base station to the data of the user equipment that should be borne by the second base station, a proportion of the data of the user equipment that should be borne by the second base station to data of the user equipment that should be jointly borne by the first base station and the second base station, and a proportion of the data of the user equipment that should be borne by the first base station to the data of the user equipment that should be jointly borne by the first base station and the second base station.

Herein, the first base station is a macro base station, and the second base station is a micro base station. Therefore, the sending, by a first base station, a first data offloading proportion to a user equipment in step 301 is specifically: sending, by the first base station, the first data offloading proportion to the user equipment through the second base station.

Certainly, if the first base station is used as a micro base station, and the second base station is used as a macro base station, the first base station directly sends the first data offloading proportion received from the second base station to the user equipment.

302: The user equipment receives the first data offloading proportion sent by the first base station or a second base station.

303: The user equipment generates, based on the first data offloading proportion, a first buffer status report and a second buffer status report.

A buffered data volume included in the first buffer status report needs to be transmitted by the first base station. A buffered data volume included in the second buffer status report needs to be transmitted by the second base station. A proportion of the buffered data volume included in the first buffer status report to the buffered data volume included in the second buffer status report is determined by the user equipment based on the first data offloading proportion.

304: The user equipment sends the first buffer status report to the first base station, and sends the second buffer status report to the second base station.

305: The first base station receives the first buffer status report that is generated based on the first data offloading proportion and sent by the user equipment.

The buffered data volume included in the first buffer status report needs to be transmitted by the first base station.

306: The user equipment receives first uplink resource scheduling information that is sent by the first base station based on the first buffer status report, and second uplink resource scheduling information that is sent by the second base station based on the second buffer status report.

A first uplink transmission resource indicated by the first uplink resource scheduling information is used to transmit the data of the user equipment that should be borne by the first base station, and a second uplink transmission resource indicated by the second uplink resource scheduling information is used to transmit the data of the user equipment that should be borne by the second base station.

According to the resource scheduling method provided by this embodiment of the present invention, a user equipment separately generates, according to a data offloading proportion sent by the first base station, buffer status reports corresponding to a second base station and a first base station, and then the second base station or the first base station generates resource scheduling information according to a corresponding buffer status report and sends the resource scheduling information to the user equipment, implementing flexible scheduling of the second base station and the first base station and related data transmission of the user equipment, so as to implement flexible and proper allocation, of a data service of the user equipment, between different base stations on a basis of meeting a high rate data transmission demand of the user equipment.

Figure 4:
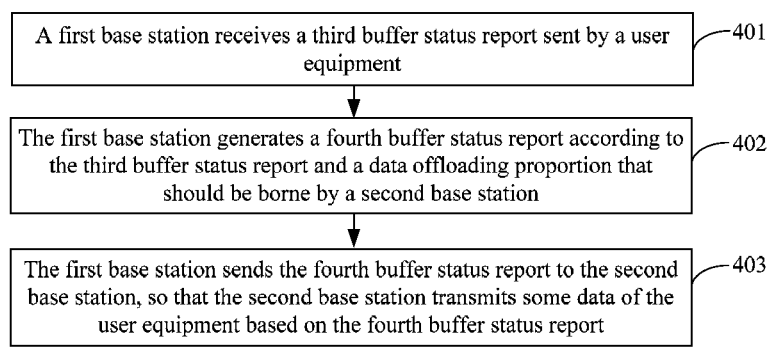
FIG. 4 is a schematic flowchart of a resource scheduling method according to another embodiment of the present invention.

An embodiment of the present invention provides a resource scheduling method. Referring to FIG. 4, a first base station side includes the following processes:

401: A first base station receives a third buffer status report sent by a user equipment.

The third buffer status report includes a total buffered data volume of the user equipment.

402: The first base station generates a fourth buffer status report according to the third buffer status report and a data offloading proportion that should be borne by a second base station.

The data offloading proportion that should be borne by the second base station includes at least one of the following items: a proportion of data of the user equipment that should be borne by the second base station to data of the user equipment that should be borne by the first base station, and a proportion of the data of the user equipment that should be borne by the second base station to data of the user equipment that should be jointly borne by the first base station and the second base station, and a buffered data volume included in the fourth buffer status report needs to be transmitted by the second base station.

403: The first base station sends the fourth buffer status report to the second base station, so that the second base station transmits some data of the user equipment based on the fourth buffer status report.

According to the resource scheduling method provided by this embodiment of the present invention, a base station determines uplink resource scheduling information by using a corresponding data offloading proportion and a buffer status report that is sent by a user equipment, so as to implement flexible and proper allocation, of a data service of the user equipment, between different base stations on a basis of meeting a high rate service demand of the user equipment.

Figure 5:
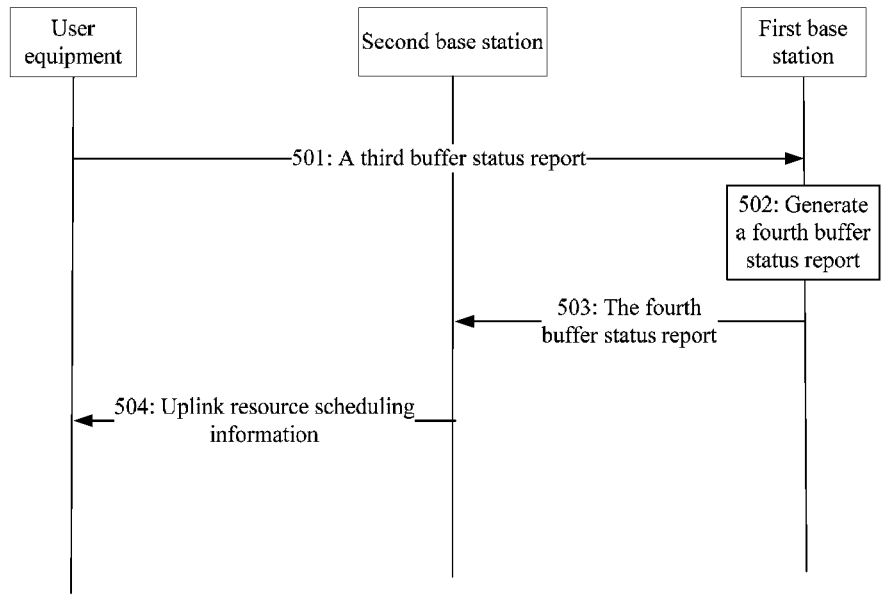
FIG. 5 is a schematic flowchart of another resource scheduling method according to still another embodiment of the present invention.

An embodiment of the present invention provides a resource scheduling method. In this embodiment, descriptions are provided by using an example in which a first base station is a Macro eNB (macro evolved node base, macro evolved node base, macro eNB for short), and a second base station is a pico eNB (Pico eNB) controlled by the macro eNB or a femto eNB (femto eNB) controlled by the macro eNB. For example, in a 3GPP LTE (the 3rd generation partnership project long term evolution, the 3rd Generation Partnership Project Long Term Evolution) standard, a Macro eNB is used to represent a first base station. Corresponding to a user equipment, referring to FIG. 5, the method includes the following processes:

501: A user equipment sends a third buffer status report to a first base station.

The third buffer status report includes a total buffered data volume of the user equipment.

502: The first base station receives the third buffer status report sent by the user equipment, and generates a fourth buffer status report according to the third buffer status report and a data offloading proportion that should be borne by a second base station.

The data offloading proportion that should be borne by the second base station includes at least one of the following items: a proportion of data of the user equipment that should be borne by the second base station to data of the user equipment that should be borne by the first base station, and a proportion of the data of the user equipment that should be borne by the second base station to data of the user equipment that should be jointly borne by the first base station and the second base station, and a buffered data volume included in the fourth buffer status report needs to be transmitted by the second base station.

Herein, the first base station is a macro base station, and the second base station is a micro base station. Particularly, corresponding to the third buffer status report in 501, when the total buffered data volume includes a control signaling data packet, the first base station itself prioritizes transmission of the control signaling data packet.

503: The first base station sends the fourth buffer status report to the second base station, so that the second base station transmits some data of the user equipment based on the fourth buffer status report.

504: The second base station receives the fourth buffer status report sent by the first base station, generates uplink resource scheduling information according to the fourth buffer status report, and sends the uplink resource scheduling information to the user equipment, so that the user equipment sends buffered data by using a resource indicated by the uplink resource scheduling information.

According to the resource scheduling method provided by this embodiment of the present invention, a first base station determines, according to a buffer status report sent by a user equipment and a data offloading proportion, a proportion of data borne by a second base station to all to-be-transferred data of the user equipment, and instructs, in a form of a buffer status report, the second base station to allocate an uplink resource to to-be-buffered data sent by the user equipment, implementing flexible scheduling of the second base station and the first base station and related data transmission of the user equipment, so as to implement flexible and proper allocation, of a data service of the user equipment, between different base stations on a basis of meeting a high rate service demand of the user equipment.

Figure 6:
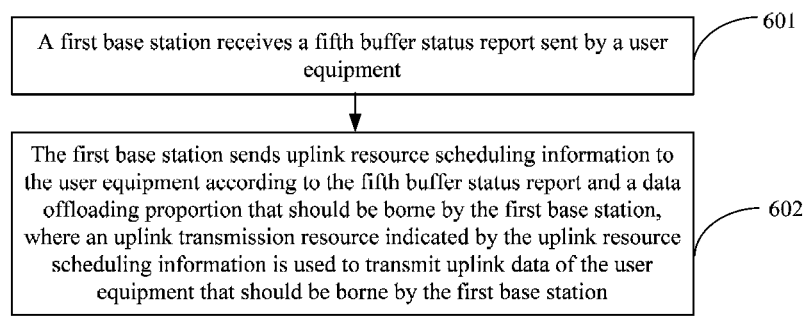
FIG. 6 is a schematic flowchart of a resource scheduling method according to yet another embodiment of the present invention.

An embodiment of the present invention provides a resource scheduling method. Referring to FIG. 6, a first base station side includes the following processes:

601: A first base station receives a fifth buffer status report sent by a user equipment.

The fifth buffer status report includes a total buffered data volume of the user equipment.

602: The first base station sends uplink resource scheduling information to the user equipment according to the fifth buffer status report and a data offloading proportion that should be borne by the first base station, where an uplink transmission resource indicated by the uplink resource scheduling information is used to transmit uplink data of the user equipment that should be borne by the first base station.

The data offloading proportion that should be borne by the first base station includes at least one of the following items: a proportion of data of the user equipment that should be borne by the first base station to data of the user equipment that should be borne by a second base station, and a proportion of the data of the user equipment that should be borne by the first base station to data of the user equipment that should be jointly borne by the first base station and the second base station.

In addition, a first carrier used by the first base station to serve the user equipment and a second carrier used by the second base station to serve the user equipment are different in frequency.

According to the resource scheduling method provided by this embodiment of the present invention, a base station determines uplink resource scheduling information by using a corresponding data offloading proportion and a buffer status report that is sent by a user equipment, so as to implement flexible and proper allocation, of a data service of the user equipment, between different base stations on a basis of ensuring high rate data transmission of the user equipment.

Figure 7:
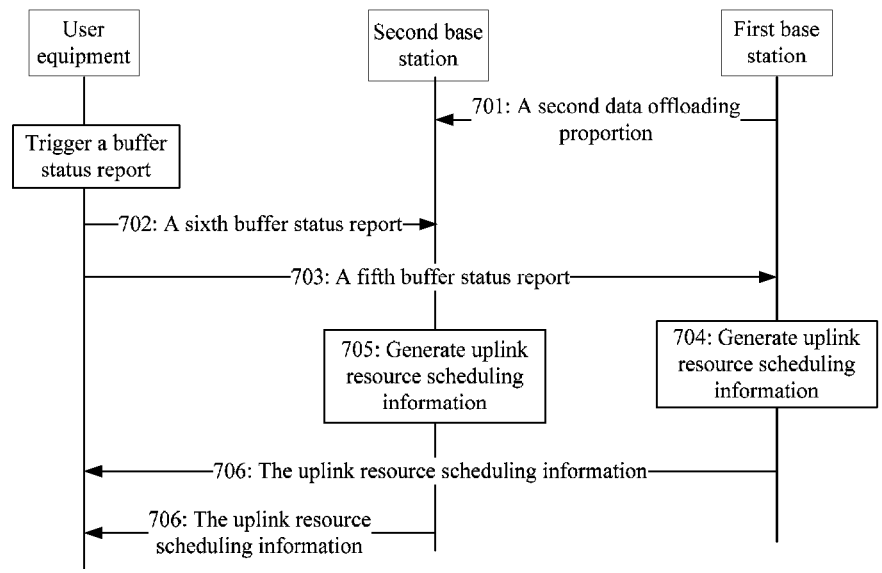
FIG. 7 is a schematic flowchart of another resource scheduling method according to still yet another embodiment of the present invention.

An embodiment of the present invention provides a resource scheduling method. Certainly a first base station may be a macro base station, and a second base station is a corresponding micro base station; or a second base station is a macro base station, and a first base station is a corresponding micro base station. In this embodiment, descriptions are provided by using an example in which a first base station is a Macro eNB (macro evolved node base, macro evolved node base, macro eNB for short), and a second base station is a pico eNB (Pico eNB) controlled by the macro eNB or a femto eNB (femto eNB) controlled by the macro eNB. For example, in a 3GPP LTE (the 3rd generation partnership project long term evolution, the 3rd Generation Partnership Project Long Term Evolution) standard, a Macro eNB is used to represent a first base station. Corresponding to a user equipment, referring to FIG. 7, the method includes the following processes:

701: A first base station sends a second data offloading proportion to a second base station.

The second data offloading proportion is a data proportion that should be borne by the second base station.

702: A user equipment sends a sixth buffer status report to the second base station.

The sixth buffer status report includes a total buffered data volume of the user equipment. In addition, the sixth buffer status report is triggered by the user equipment according to a multicast routing protocol and according to a used bootstrap router.

703: The user equipment sends a fifth buffer status report to the first base station.

The fifth buffer status report includes the total buffered data volume of the user equipment. Herein, obviously, the fifth buffer status report and the sixth buffer status report include same content. Therefore, the fifth buffer status report and the sixth buffer status report may be a same buffer status report.

704: The first base station receives the fifth buffer status report sent by the user equipment, sends uplink resource scheduling information to the user equipment according to the fifth buffer status report and a data offloading proportion that should be borne by the first base station, where an uplink transmission resource indicated by the uplink resource scheduling information is used to transmit uplink data of the user equipment that should be borne by the first base station.

The data offloading proportion that should be borne by the first base station includes at least one of the following items: a proportion of data of the user equipment that should be borne by the first base station to data of the user equipment that should be borne by a second base station, and a proportion of the data of the user equipment that should be borne by the first base station to data of the user equipment that should be jointly borne by the first base station and the second base station.

705: The second base station receives the sixth buffer status report sent by the user equipment, sends uplink resource scheduling information to the user equipment according to the sixth buffer status report and a data offloading proportion that should be borne by the second base station, where an uplink transmission resource indicated by the uplink resource scheduling information is used to transmit uplink data of the user equipment that should be borne by the second base station.

The data offloading proportion that should be borne by the second base station includes at least one of the following items: a proportion of data of the user equipment that should be borne by the second base station to data of the user equipment that should be borne by the first base station, and a proportion of the data of the user equipment that should be borne by the second base station to data of the user equipment that should be jointly borne by the second base station and the first base station.

706: The user equipment receives the uplink resource scheduling information sent by the first base station and the second base station, and sends buffered data by using a resource indicated by the uplink resource scheduling information.

According to the resource scheduling method provided by this embodiment of the present invention, a second base station and a first base station determine, according to a data offloading proportion and a buffer status report that is reported by a user equipment, an uplink resource that needs to be allocated to the user equipment, implementing flexible scheduling of the second base station and the first base station and related data transmission of the user equipment, so as to implement flexible and proper allocation, of a data service of the user equipment, between different base stations on a basis of meeting a high rate service demand of the user equipment.

Figure 8:
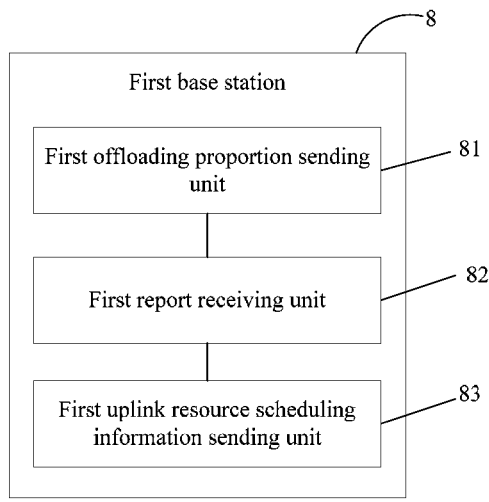
FIG. 8 is a schematic structural diagram of a first base station according to an embodiment of the present invention.

An embodiment of the present invention provides a first base station 8. Referring to FIG. 8, the first base station 8 includes: a first offloading proportion sending unit 81, a first report receiving unit 82, and a first uplink resource scheduling information sending unit 83.

The first offloading proportion sending unit 81 is configured to send a first data offloading proportion to a user equipment, where the first data offloading proportion includes at least one of the following items: a proportion of data of the user equipment that should be borne by a second base station to data of the user equipment that should be borne by the first base station, a proportion of the data of the user equipment that should be borne by the first base station to the data of the user equipment that should be borne by the second base station, a proportion of the data of the user equipment that should be borne by the second base station to data of the user equipment that should be jointly borne by the first base station and the second base station, and a proportion of the data of the user equipment that should be borne by the first base station to the data of the user equipment that should be jointly borne by the first base station and the second base station.

The first report receiving unit 82 is configured to receive a first buffer status report that is generated based on the first data offloading proportion and sent by the user equipment, where a buffered data volume included in the first buffer status report needs to be transmitted by the first base station.

The first uplink resource scheduling information sending unit 83 is configured to send uplink resource scheduling information to the user equipment based on the first buffer status report, where an uplink transmission resource indicated by the uplink resource scheduling information is used to transmit uplink data of the user equipment that should be borne by the first base station.

Further, the first base station provided by this embodiment of the present invention further includes that:

the first base station is a macro base station, the second base station is a micro base station, and the first offloading proportion sending unit 81 is specifically configured to send the first data offloading proportion to the user equipment through the second base station; or the first base station is a micro base station, the second base station is a macro base station, and the first offloading proportion sending unit 81 is specifically configured to send the first data offloading proportion received from the second base station to the user equipment.

A first carrier used by the first base station to serve the user equipment and a second carrier used by the second base station to serve the user equipment are different in frequency.

According to the first base station provided by this embodiment of the present invention, a user equipment separately generates, according to a data offloading proportion sent by the first base station, buffer status reports corresponding to a second base station and the first base station, and then the second base station or the first base station generates resource scheduling information according to a corresponding buffer status report and sends the resource scheduling information to the user equipment, implementing flexible scheduling of the second base station and the first base station and related data transmission of the user equipment, so as to implement flexible and proper allocation, of a data service of the user equipment, between different base stations on a basis of meeting a high rate data transmission demand of the user equipment.

Figure 9:
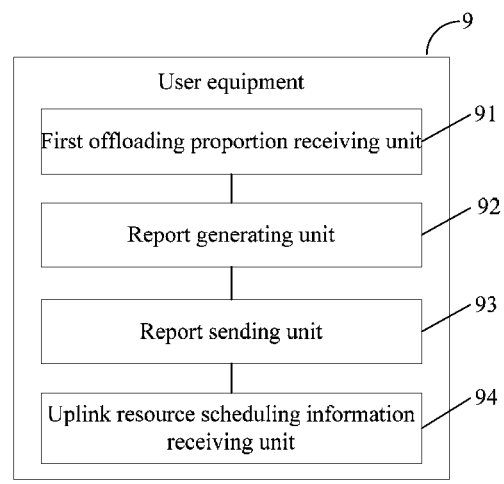
FIG. 9 is a schematic structural diagram of a user equipment according to an embodiment of the present invention.

Referring to FIG. 9, a user equipment 9 is provided, including: a first offloading proportion receiving unit 91, a report generating unit 92, a report sending unit 93, and an uplink resource scheduling information receiving unit 94.

The first offloading proportion receiving unit 91 is configured to receive a first data offloading proportion from a first base station or a second base station, where the first data offloading proportion includes at least one of the following items: a proportion of data of the user equipment that should be borne by the first base station to data of the user equipment that should be borne by the second base station, a proportion of the data of the user equipment that should be borne by the second base station to the data of the user equipment that should be borne by the first base station, a proportion of the data of the user equipment that should be borne by the second base station to data of the user equipment that should be jointly borne by the first base station and the second base station, and a proportion of the data of the user equipment that should be borne by the first base station to the data of the user equipment that should be jointly borne by the first base station and the second base station.

The report generating unit 92 is configured to generate, based on the first data offloading proportion, a first buffer status report and a second buffer status report, where a buffered data volume included in the first buffer status report needs to be transmitted by the first base station, and a buffered data volume included in the second buffer status report needs to be transmitted by the second base station.

Optionally, a proportion of the buffered data volume included in the first buffer status report to the buffered data volume included in the second buffer status report is determined by the user equipment based on the first data offloading proportion.

The report sending unit 93 is configured to send the first buffer status report to the first base station, and sends the second buffer status report to the second base station.

The uplink resource scheduling information receiving unit 94 is configured to receive first uplink resource scheduling information that is sent by the first base station based on the first buffer status report, and second uplink resource scheduling information that is sent by the second base station based on the second buffer status report, where a first uplink transmission resource indicated by the first uplink resource scheduling information is used to transmit the data of the user equipment that should be borne by the first base station, and a second uplink transmission resource indicated by the second uplink resource scheduling information is used to transmit the data of the user equipment that should be borne by the second base station.

In addition, a first carrier used by the first base station to serve the user equipment and a second carrier used by the second base station to serve the user equipment are different in frequency.

The user equipment provided by this embodiment of the present invention can separately generate, according to a data offloading proportion sent by a first base station, buffer status reports corresponding to a second base station and the first base station, and then the second base station or the first base station generates resource scheduling information according to a corresponding buffer status report and sends the resource scheduling information to the user equipment, implementing flexible scheduling of the second base station and the first base station and related data transmission of the user equipment, so as to implement flexible and proper allocation, of a data service of the user equipment, between different base stations on a basis of meeting a high rate service demand of the user equipment.

Figure 10:
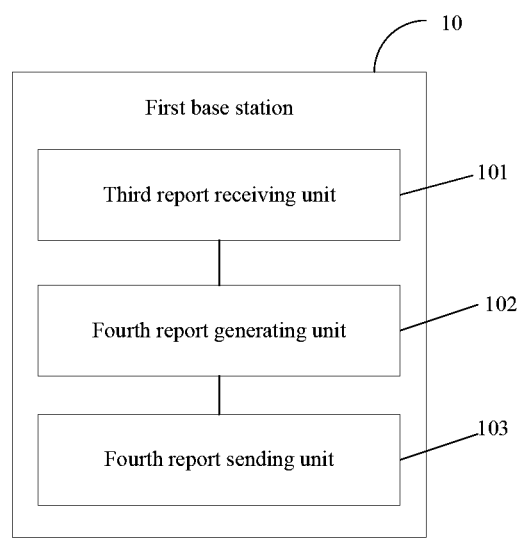
FIG. 10 is a schematic structural diagram of a first base station according to another embodiment of the present invention.

As shown in FIG. 10, an embodiment of the present invention provides a first base station 10, including: a third report receiving unit 101, a fourth report generating unit 102, and a fourth report sending unit 103.

The third report receiving unit 101 is configured to receive a third buffer status report sent by a user equipment, where the third buffer status report includes a total buffered data volume of the user equipment.

The fourth report generating unit 102 is configured to generate a fourth buffer status report according to the third buffer status report and a data offloading proportion that should be borne by a second base station, where the data offloading proportion that should be borne by the second base station includes at least one of the following items: a proportion of data of the user equipment that should be borne by the second base station to data of the user equipment that should be borne by the first base station, and a proportion of the data of the user equipment that should be borne by the second base station to data of the user equipment that should be jointly borne by the first base station and the second base station, and a buffered data volume included in the fourth buffer status report needs to be transmitted by the second base station.

The fourth report sending unit 103 is configured to send the fourth buffer status report to the second base station, so that the second base station transmits some data of the user equipment based on the fourth buffer status report.

Optionally, the first base station is a macro base station, and the second base station is a micro base station. When the total buffered data volume includes a control signaling data packet, the first base station itself prioritizes transmission of the control signaling data packet.

In addition, a first carrier used by the first base station to serve the user equipment and a second carrier used by the second base station to serve the user equipment are different in frequency.

According to the first base station provided by this embodiment of the present invention, the first base station determines, according to a buffer status report sent by a user equipment and a data offloading proportion, a proportion of data borne by a second base station to all to-be-transferred data of the user equipment, and instructs, in a form of a buffer status report, the second base station to allocate an uplink resource to to-be-buffered data sent by the user equipment, implementing flexible scheduling of the second base station and the first base station and related data transmission of the user equipment, so as to implement flexible and proper allocation, of a data service of the user equipment, between different base stations on a basis of meeting a high rate service demand of the user equipment.

Figure 11:
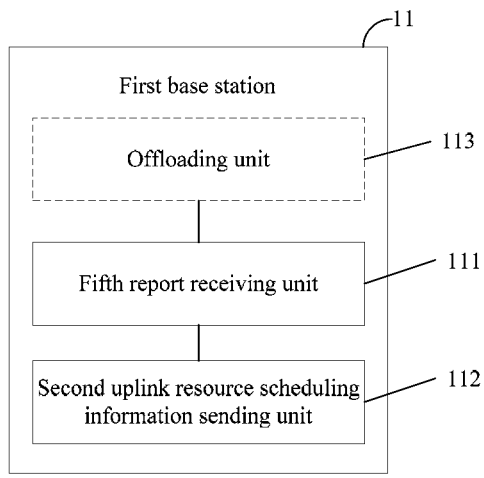
FIG. 11 is a schematic structural diagram of a first base station according to still another embodiment of the present invention.

As shown in FIG. 11, an embodiment of the present invention provides a first base station 11, including: a fifth report receiving unit 111 and a second uplink resource scheduling information sending unit 112.

The fifth report receiving unit 111 is configured to receive a fifth buffer status report sent by a user equipment, where the fifth buffer status report includes a total buffered data volume of the user equipment.

The second uplink resource scheduling information sending unit 112 is configured to send uplink resource scheduling information to the user equipment according to the fifth buffer status report and a data offloading proportion that should be borne by the first base station, where an uplink transmission resource indicated by the uplink resource scheduling information is used to transmit uplink data of the user equipment that should be borne by the first base station.

The data offloading proportion that should be borne by the first base station includes at least one of the following items: a proportion of data of the user equipment that should be borne by the first base station to data of the user equipment that should be borne by a second base station, and a proportion of the data of the user equipment that should be borne by the first base station to data of the user equipment that should be jointly borne by the first base station and the second base station.

Further optionally, the first base station further includes: an offloading unit 113, where the offloading unit 113 is configured to determine the data offloading proportion that should be borne by the first base station, and send the data offloading proportion that should be borne by the first base station to the second base station; or the offloading unit 113 is configured to receive the data offloading proportion that should be borne by the first base station from the second base station.

In addition, a first carrier used by the first base station to serve the user equipment and a second carrier used by the second base station to serve the user equipment are different in frequency.

According to the first base station and the second base station provided by this embodiment of the present invention, the second base station and the first base station determine, according to a data offloading proportion and a buffer status report that is reported by a user equipment, an uplink resource that needs to be allocated to the user equipment, implementing flexible scheduling of the second base station and the first base station and related data transmission of the user equipment, so as to implement flexible and proper allocation, of a data service of the user equipment, between different base stations on a basis of meeting a high rate service demand of the user equipment.

Figure 12:
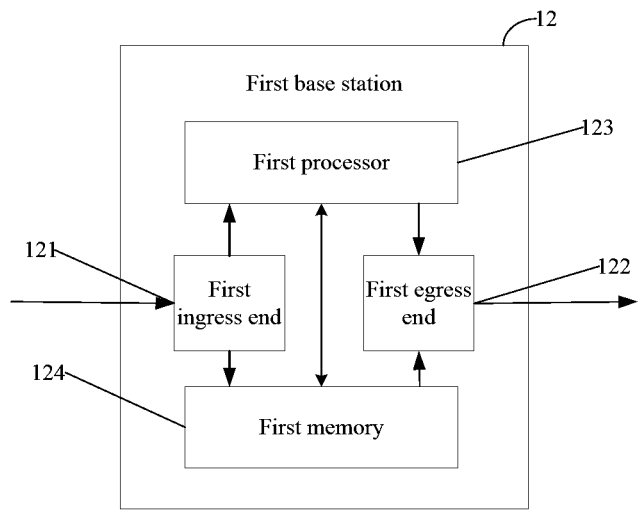
FIG. 12 is a schematic structural diagram of a first base station according to yet another embodiment of the present invention.

An embodiment of the present invention provides a first base station. As shown in FIG. 12, the first base station includes: at least one first ingress end 121, at least one first egress end 122, a first processor 123, and a first memory 124.

The first processor 123 is configured to send a first data offloading proportion to a user equipment by using the at least one egress end 122, where the first data offloading proportion includes at least one of the following items: a proportion of data of the user equipment that should be borne by a second base station to data of the user equipment that should be borne by the first base station, a proportion of the data of the user equipment that should be borne by the first base station to the data of the user equipment that should be borne by the second base station, a proportion of the data of the user equipment that should be borne by the second base station to data of the user equipment that should be jointly borne by the first base station and the second base station, and a proportion of the data of the user equipment that should be borne by the first base station to the data of the user equipment that should be jointly borne by the first base station and the second base station.

The first processor 123 is configured to receive, by using the at least one first ingress end 121, a first buffer status report that is generated based on the first data offloading proportion and sent by the user equipment, where a buffered data volume included in the first buffer status report needs to be transmitted by the first base station. The first processor 123 is configured to send uplink resource scheduling information to the user equipment based on the first buffer status report by using the at least one first egress end 122, where an uplink transmission resource, which is indicated by the uplink resource scheduling information, in the first memory 124 is used to transmit uplink data of the user equipment that should be borne by the first base station.

The first processor 123 is configured to send the uplink resource scheduling information to the user equipment based on the first buffer status report by using the at least one first egress end 122, where the uplink transmission resource, which is indicated by the uplink resource scheduling information, in the first memory 124 is used to transmit the uplink data of the user equipment that should be borne by the first base station.

Optionally, the first base station is a macro base station, the second base station is a micro base station, and the first processor 123 is specifically configured to send the first data offloading proportion to the user equipment through the second base station by using the at least one egress end 122; or the first base station is a micro base station, the second base station is a macro base station, and the first processor 123 is specifically configured to send the first data offloading proportion, which is received from the second base station by using the at least one ingress end 121, to the user equipment by using the at least one egress end 122.

According to the first base station provided by this embodiment of the present invention, a user equipment separately generates, according to a data offloading proportion sent by the first base station, buffer status reports corresponding to a second base station and the first base station, and then the second base station or the first base station generates resource scheduling information according to a corresponding buffer status report and sends the resource scheduling information to the user equipment, implementing flexible scheduling of the second base station and the first base station and related data transmission of the user equipment, so as to implement flexible and proper allocation, of a data service of the user equipment, between different base stations on a basis of meeting a high rate data transmission demand of the user equipment.

Figure 13:
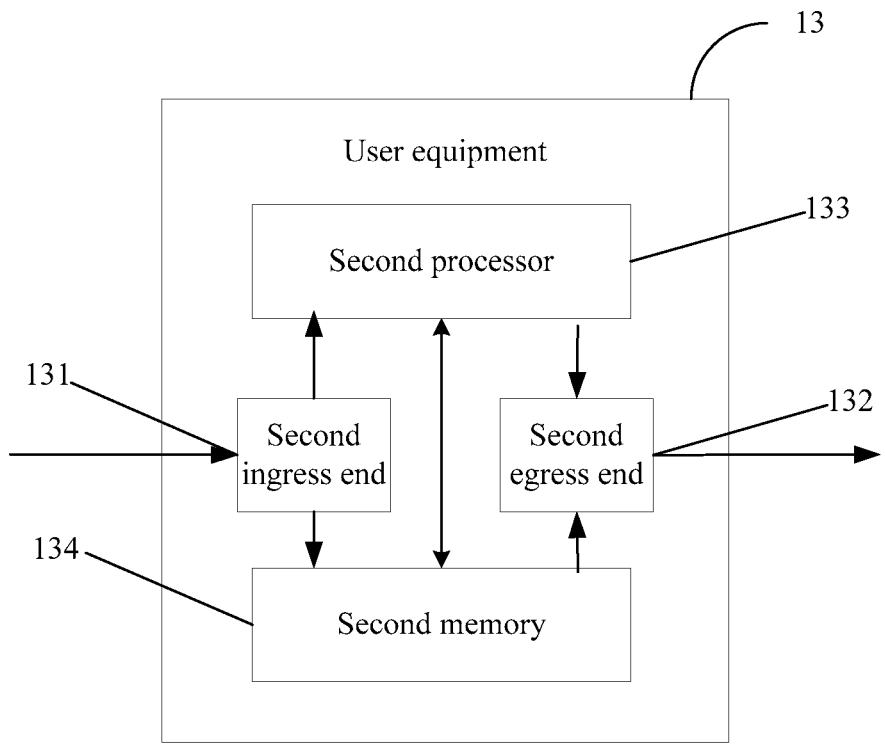
FIG. 13 is a schematic structural diagram of a user equipment according to another embodiment of the present invention.

Referring to FIG. 13, a user equipment 13 is provided, including: at least one second ingress end 131, at least one second egress end 132, a second processor 133, and a second memory 134.

The second processor 133 is configured to receive a first data offloading proportion from a first base station or a second base station by using the at least one second ingress end 131, where the first data offloading proportion includes at least one of the following items: a proportion of data of the user equipment that should be borne by the first base station to data of the user equipment that should be borne by the second base station, a proportion of the data of the user equipment that should be borne by the second base station to the data of the user equipment that should be borne by the first base station, a proportion of the data of the user equipment that should be borne by the second base station to data of the user equipment that should be jointly borne by the first base station and the second base station, and a proportion of the data of the user equipment that should be borne by the first base station to the data of the user equipment that should be jointly borne by the first base station and the second base station.

The second processor 133 is configured to generate, based on the first data offloading proportion, a first buffer status report and a second buffer status report, where a buffered data volume included in the first buffer status report needs to be transmitted by the first base station, and a buffered data volume included in the second buffer status report needs to be transmitted by the second base station.

Optionally, a proportion of the buffered data volume included in the first buffer status report to the buffered data volume included in the second buffer status report is determined by the user equipment based on the first data offloading proportion.

The second processor 133 is configured to send the first buffer status report to the first base station by using the at least one second egress end 132, and send the second buffer status report to the second base station by using the at least one second egress end 132.

The second processor 133 is configured to receive, by using the at least one second ingress end 131, first uplink resource scheduling information that is sent by the first base station based on the first buffer status report, and second uplink resource scheduling information that is sent by the second base station based on the second buffer status report, where a first uplink transmission resource indicated by the first uplink resource scheduling information is used to transmit data of the user equipment that should be borne by the first base station in the second memory 134, and a second uplink transmission resource indicated by the second uplink resource scheduling information is used to transmit data of the user equipment that should be borne by the second base station in the second memory 134.

In addition, a first carrier used by the first base station to serve the user equipment and a second carrier used by the second base station to serve the user equipment are different in frequency.

The user equipment provided by this embodiment of the present invention can separately generate, according to a data offloading proportion sent by a first base station, buffer status reports corresponding to a second base station and the first base station, and then the second base station or the first base station generates resource scheduling information according to a corresponding buffer status report and sends the resource scheduling information to the user equipment, implementing flexible scheduling of the second base station and the first base station and related data transmission of the user equipment, so as to implement flexible and proper allocation, of a data service of the user equipment, between different base stations on a basis of meeting a high rate service demand of the user equipment.

Figure 14:
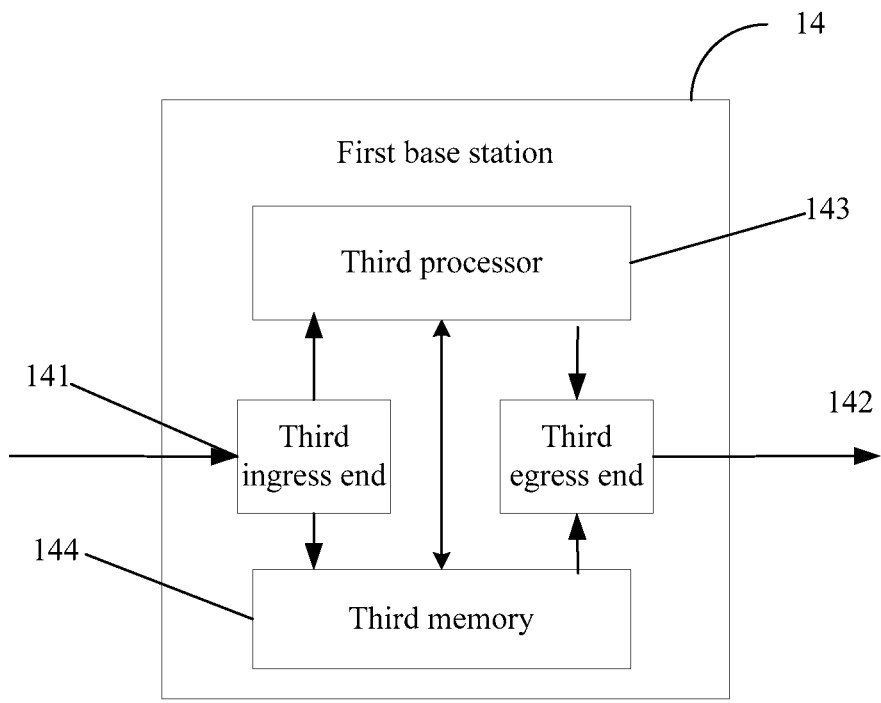
FIG. 14 is a schematic structural diagram of a first base station according to still yet another embodiment of the present invention.

As shown in FIG. 14, an embodiment of the present invention provides a first base station 14, including: at least one third ingress end 141, at least one third egress end 142, a third processor 143, and a third memory 144.

The third processor 143 is configured to receive, by using the at least one third ingress end 141, a third buffer status report sent by a user equipment, where the third buffer status report includes a total buffered data volume of the user equipment.

The third processor 143 is configured to generate a fourth buffer status report according to the third buffer status report and a data offloading proportion that should be borne by a second base station, where the data offloading proportion that should be borne by the second base station includes at least one of the following items: a proportion of data of the user equipment that should be borne by the second base station to data of the user equipment that should be borne by the first base station, and a proportion of the data of the user equipment that should be borne by the second base station to data of the user equipment that should be jointly borne by the first base station and the second base station, and a buffered data volume included in the fourth buffer status report needs to be transmitted by the second base station.

The third processor 143 is configured to send the fourth buffer status report to the second base station by using the at least one third egress end 142, so that the second base station transmits some data of the user equipment based on the fourth buffer status report.

Optionally, the first base station is a macro base station, and the second base station is a micro base station. When the total buffered data volume includes a control signaling data packet, the first base station itself prioritizes transmission of the control signaling data packet.

In addition, a first carrier used by the first base station to serve the user equipment and a second carrier used by the second base station to serve the user equipment are different in frequency.

According to the first base station provided by this embodiment of the present invention, the first base station determines, according to a buffer status report sent by a user equipment and a data offloading proportion, a proportion of data borne by a second base station to all to-be-transferred data of the user equipment, and instructs, in a form of a buffer status report, the second base station to allocate an uplink resource to to-be-buffered data sent by the user equipment, implementing flexible scheduling of the second base station and the first base station and related data transmission of the user equipment, so as to implement flexible and proper allocation, of a data service of the user equipment, between different base stations on a basis of meeting a high rate service demand of the user equipment.

Figure 15:
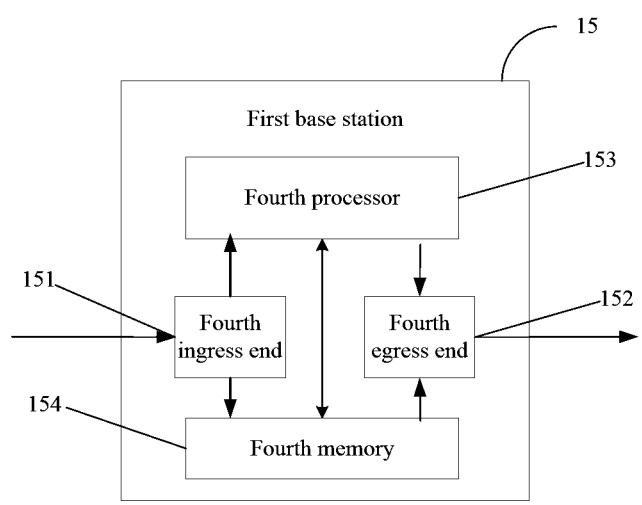
FIG. 15 is a schematic structural diagram of a first base station according to a further embodiment of the present invention.

As shown in FIG. 15, an embodiment of the present invention provides a first base station 15, including: at least one fourth ingress end 151, at least one fourth egress end 152, a fourth processor 153, and a fourth memory 154.

The fourth processor 153 is configured to receive, by using the at least one fourth ingress end 151, a fifth buffer status report sent by a user equipment, where the fifth buffer status report includes a total buffered data volume of the user equipment.

The fourth processor 152 is configured to send, according to the fifth buffer status report and a data offloading proportion that should be borne by the first base station, uplink resource scheduling information to the user equipment by using the at least one fourth egress end 152, where an uplink transmission resource, which is indicated by the uplink resource scheduling information, in the fourth memory 154 is used to transmit uplink data of the user equipment that should be borne by the first base station.

The data offloading proportion that should be borne by the first base station includes at least one of the following items: a proportion of data of the user equipment that should be borne by the first base station to data of the user equipment that should be borne by a second base station, and a proportion of the data of the user equipment that should be borne by the first base station to data of the user equipment that should be jointly borne by the first base station and the second base station.

Further optionally, the fourth processor 153 is further configured to determine the data offloading proportion that should be borne by the first base station, and send the data offloading proportion that should be borne by the first base station to the second base station by using the at least one fourth egress end 152; or the fourth processor 153 is configured to receive, by using the at least one fourth ingress end 151, the data offloading proportion that should be borne by the first base station from the second base station.

In addition, a first carrier used by the first base station to serve the user equipment and a second carrier used by the second base station to serve the user equipment are different in frequency.

According to the first base station and the second base station provided by this embodiment of the present invention, the second base station and the first base station determine, according to a data offloading proportion and a buffer status report that is reported by a user equipment, an uplink resource that needs to be allocated to the user equipment, implementing flexible scheduling of the second base station and the first base station and related data transmission of the user equipment, so as to implement flexible and proper allocation, of a data service of the user equipment, between different base stations on a basis of meeting a high rate service demand of the user equipment.

Figure 16:
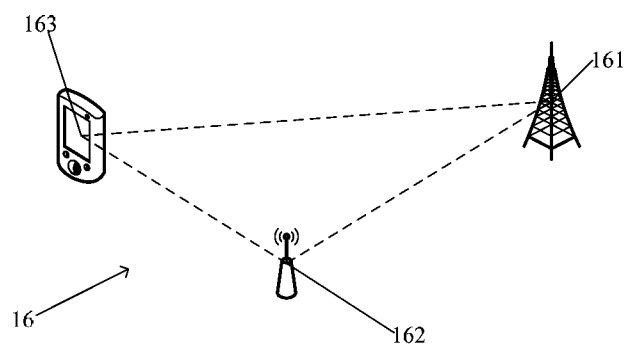
FIG. 16 is a schematic structural diagram of a communications system according to an embodiment of the present invention.

An embodiment of the present invention provides a communications system, as shown in FIG. 16, including a first base station 161, a second base station 162, and a user equipment 163, where the first base station 161 is any base station according to the embodiment corresponding to FIG. 8, and the user equipment 163 is any user equipment according to the embodiment corresponding to FIG. 9;

or, the first base station 161 is any base station according to the embodiment corresponding to FIG. 10;

or, the first base station 161 is any base station according to the embodiment corresponding to FIG. 11.

For specific working principles of the first base station, the second base station, and the user equipment, reference may be made to the foregoing method and device embodiments, which are not described in detail herein again.

According to the communications system provided by this embodiment of the present invention, a base station determines uplink resource scheduling information by using a corresponding data offloading proportion and a buffer status report that is sent by a user equipment, so as to ensure that a high rate data service is provided for a user, and also implement allocation, of a data service of the user equipment, between different base stations.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A resource scheduling method, comprising:
sending, by a first base station, a first data offloading proportion to a user equipment through a second base station, wherein the first data offloading proportion comprises at least one of the following items: a proportion of uplink data of the user equipment that is borne by the second base station to uplink data of the user equipment that is borne by the first base station, a proportion of the uplink data of the user equipment that is borne by the first base station to the uplink data of the user equipment that is borne by the second base station, a proportion of the uplink data of the user equipment that is borne by the second base station to uplink data of the user equipment that is jointly borne by the first base station and the second base station, and a proportion of the uplink data of the user equipment that is borne by the first base station to the uplink data of the user equipment that is jointly borne by the first base station and the second base station;
receiving, by the first base station, a first buffer status report that is generated based on the first data offloading proportion and sent by the user equipment, wherein the first buffer status report indicates a buffered data volume to be transmitted by the first base station; and
sending, by the first base station, uplink resource scheduling information to the user equipment based on the first buffer status report, wherein an uplink transmission resource indicated by the uplink resource scheduling information is used to transmit uplink data of the user equipment that is borne by the first base station;
wherein the first base station is a macro base station, and the second base station is a micro base station.

2. A resource scheduling method, comprising:
receiving, by a user equipment, a first data offloading proportion forwarded from a second base station which receives the first data offloading proportion from a first base station, wherein the first data offloading proportion comprises at least one of the following items: a proportion of uplink data of the user equipment that is borne by the first base station to uplink data of the user equipment that is borne by the second base station, a proportion of the uplink data of the user equipment that is borne by the second base station to the uplink data of the user equipment that is borne by the first base station, a proportion of the uplink data of the user equipment that is borne by the second base station to uplink data of the user equipment that is jointly borne by the first base station and the second base station, and a proportion of the uplink data of the user equipment that is borne by the first base station to the uplink data of the user equipment that is jointly borne by the first base station and the second base station;
generating, by the user equipment based on the first data offloading proportion, a first buffer status report and a second buffer status report, wherein the first buffer status report indicates a buffered data volume to be transmitted by the first base station, and the second buffer status report indicates a buffered data volume available for transmission implemented by the second base station;
sending, by the user equipment, the first buffer status report to the first base station, and sending the second buffer status report to the second base station; and
receiving, by the user equipment, first uplink resource scheduling information that is sent by the first base station based on the first buffer status report, and second uplink resource scheduling information that is sent by the second base station based on the second buffer status report, wherein a first uplink transmission resource indicated by the first uplink resource scheduling information is used to transmit the uplink data of the user equipment that is borne by the first base station, and a second uplink transmission resource indicated by the second uplink resource scheduling information is used to transmit the uplink data of the user equipment that is borne by the second base station;
wherein the first base station is a macro base station, and the second base station is a micro base station.

3. The method according to claim 2, wherein a proportion of the buffered data volume comprised in the first buffer status report to the buffered data volume comprised in the second buffer status report is determined by the user equipment based on the first data offloading proportion.

4. A resource scheduling method, comprising:
determining, by a first base station, a data offloading proportion that is currently borne by the first base station, and sending the data offloading proportion to a user equipment through a second base station;
receiving, by the first base station, a buffer status report sent by the user equipment, wherein the buffer status report comprises a total buffered data volume of the user equipment;
sending, by the first base station, uplink resource scheduling information to the user equipment according to the buffer status report and the data offloading proportion that is borne by the first base station, wherein an uplink transmission resource indicated by the uplink resource scheduling information is used to transmit uplink data of the user equipment that is borne by the first base station, wherein
the data offloading proportion that is borne by the first base station comprises at least one of the following items: a proportion of uplink data of the user equipment that is borne by the first base station to uplink data of the user equipment that is borne by the second base station, and a proportion of the uplink data of the user equipment that is borne by the first base station to uplink data of the user equipment that is jointly borne by the first base station and the second base station;
wherein the first base station is a macro base station, and the second base station is a micro base station.

5. A first base station, comprising:
a processor; and
a memory storing computer program instructions which, when executed by the processor, perform operations comprising:
sending a first data offloading proportion to a user equipment through a second base station, wherein the first data offloading proportion comprises at least one of the following items: a proportion of uplink data of the user equipment that is borne by a second base station to uplink data of the user equipment that is borne by the first base station, a proportion of the uplink data of the user equipment that is borne by the first base station to the uplink data of the user equipment that is borne by the second base station, a proportion of the uplink data of the user equipment that is borne by the second base station to uplink data of the user equipment that is jointly borne by the first base station and the second base station, and a proportion of the uplink data of the user equipment that is borne by the first base station to the uplink data of the user equipment that is jointly borne by the first base station and the second base station;

receiving a first buffer status report that is generated based on the first data offloading proportion and sent by the user equipment, wherein the first buffer status report indicates a buffered data volume to be transmitted by the first base station; and sending uplink resource scheduling information to the user equipment based on the first buffer status report, wherein an uplink transmission resource indicated by the uplink resource scheduling information is used to transmit uplink data of the user equipment that is borne by the first base station;

wherein the first base station is a macro base station, and the second base station is a micro base station.

6. A user equipment, comprising:

a processor; and a memory storing computer program instructions which, when executed by the processor, perform operations comprising:

receiving a first data offloading proportion forwarded from a second base station which receives the first data offloading proportion from a first base station, wherein the first data offloading proportion comprises at least one of the following items: a proportion of uplink data of the user equipment that is borne by the first base station to uplink data of the user equipment that is borne by the second base station, a proportion of the uplink data of the user equipment that is borne by the second base station to the uplink data of the user equipment that is borne by the first base station, a proportion of the uplink data of the user equipment that is borne by the second base station to uplink data of the user equipment that is jointly borne by the first base station and the second base station, and a proportion of the uplink data of the user equipment that is borne by the first base station to the uplink data of the user equipment that is jointly borne by the first base station and the second base station;

generating, based on the first data offloading proportion, a first buffer status report and a second buffer status report, wherein the first buffer status report indicates a buffered data volume available for transmission implemented by the first base station, and the second buffer status report indicates a buffered data volume to be transmitted by the second base station;

sending the first buffer status report to the first base station, and sending the second buffer status report to the second base station; and receiving first uplink resource scheduling information that is sent by the first base station based on the first buffer status report, and second uplink resource scheduling information that is sent by the second base station based on the second buffer status report, wherein a first uplink transmission resource indicated by the first uplink resource scheduling information is used to transmit the uplink data of the user equipment that is borne by the first base station, and a second uplink transmission resource indicated by the second uplink resource scheduling information is used to transmit the uplink data of the user equipment that is borne by the second base station;

wherein the first base station is a macro base station, and the second base station is a micro base station.

7. The user equipment according to claim 6, wherein a proportion of the buffered data volume comprised in the first buffer status report to the buffered data volume comprised in the second buffer status report is determined by the user equipment based on the first data offloading proportion.

8. A first base station, comprising:

a processor; and a memory storing computer program instructions which, when executed by the processor, perform operations comprising:

determining, a data offloading proportion that is currently borne by the first base station, and sending the data offloading proportion to a user equipment through a second base station when;

receiving a buffer status report sent by the user equipment, wherein the buffer status report comprises a total buffered data volume of the user equipment;

sending uplink resource scheduling information to the user equipment according to the buffer status report and the data offloading proportion that is borne by the first base station, wherein an uplink transmission resource indicated by the uplink resource scheduling information is used to transmit uplink data of the user equipment that is borne by the first base station, wherein the data offloading proportion that is borne by the first base station comprises at least one of the following items: a proportion of uplink data of the user equipment that is borne by the first base station to uplink data of the user equipment that is borne by the second base station, and a proportion of the uplink data of the user equipment that is borne by the first base station to uplink data of the user equipment that is jointly borne by the first base station and the second base station;

wherein the first base station is a macro base station, and the second base station is a micro base station.

* * * * *

UNITED STATES PATENT AND TRADEMARK OFFICE
CERTIFICATE OF CORRECTION

PATENT NO. : 9,848,409 B2
APPLICATION NO. : 14/656129
DATED : December 19, 2017
INVENTOR(S) : Chang et al.

It is certified that error appears in the above-identified patent and that said Letters Patent is hereby corrected as shown below:

Column 26, Line 33, "when" should be deleted.

Signed and Sealed this
Seventh Day of August, 2018

Andrei Iancu
*Director of the United States Patent and Trademark Office*